(12) United States Patent
Versteeg et al.

(10) Patent No.: US 9,942,321 B2
(45) Date of Patent: Apr. 10, 2018

(54) IDENTITY-TO-ACCOUNT CORRELATION AND SYNCHRONIZATION

(71) Applicant: CA, Inc., New York, NY (US)

(72) Inventors: Steven Cornelis Versteeg, Ivanhoe (AU); Nathan Allin Hastings, Glen Iris (AU); Xien Yao, Doncaster (AU); John Sinclair Bird, Ringwood North (AU)

(73) Assignee: CA, Inc., New York, NY (US)

( * ) Notice: Subject to any disclaimer, the term of this patent is extended or adjusted under 35 U.S.C. 154(b) by 284 days.

(21) Appl. No.: 14/988,982

(22) Filed: Jan. 6, 2016

(65) Prior Publication Data

US 2017/0195415 A1 Jul. 6, 2017

(51) Int. Cl.
*G06F 17/00* (2006.01)
*H04L 29/08* (2006.01)
(Continued)

(52) U.S. Cl.
CPC .... *H04L 67/1095* (2013.01); *G06F 17/30702* (2013.01); *H04L 63/102* (2013.01);
(Continued)

(58) Field of Classification Search
CPC ........... G06F 17/30702; H04L 67/1095; H04L 63/102; H04L 67/16; H04L 67/30; H04L 67/306
(Continued)

(56) References Cited

U.S. PATENT DOCUMENTS

| 7,941,785 B2 * | 5/2011 | Cole | G06Q 10/10 707/610 |
| 7,962,493 B2 * | 6/2011 | Ungureanasu | G06F 21/6227 707/754 |

(Continued)

OTHER PUBLICATIONS

Bhatti, Rafae, et al., "An Integrated Approach to Federated Identity and Privilege Management in Open Systems", Communications of the ACM, vol. 50, No. 2, Feb. 2007, pp. 81-87.*
(Continued)

*Primary Examiner* — Robert Stevens
(74) *Attorney, Agent, or Firm* — Gilliam IP PLLC

(57) ABSTRACT

A method, program product, and apparatus for managing profiles in an access management domain. In an embodiment, attribute field mapping rules are generated for an identity profile schema applied to a plurality of identity profiles and an account profile schema applied to a plurality of account profiles. Each of the identity profiles includes one or more identity attribute fields and each of the plurality of account profiles includes one or more account attribute fields. As part of generating attribute field mapping rules, a synchronization manager iteratively compares data in each of the identity attribute fields with data in one or more of each of the account attribute fields. In response to detecting a match between data in a given identity attribute field and data in a given account attribute field, the synchronization manager increments an attribute correlation value that is associated with the given identity attribute field and the given account attribute field. The synchronization manager (Continued)

compares attribute correlation values that are each associated with a same identity attribute field and identifies a dominant attribute correlation value based on said comparing attribute correlation values.

20 Claims, 7 Drawing Sheets

(51) Int. Cl.
  *H04L 29/06* (2006.01)
  *G06F 17/30* (2006.01)
(52) U.S. Cl.
  CPC .............. *H04L 67/16* (2013.01); *H04L 67/30* (2013.01); *H04L 67/306* (2013.01)
(58) Field of Classification Search
  USPC ........................................................ 707/610
  See application file for complete search history.

(56) References Cited

U.S. PATENT DOCUMENTS

| | | | | |
|---|---|---|---|---|
| 8,606,879 | B2* | 12/2013 | Winkler | H04L 63/102 709/217 |
| 8,607,322 | B2* | 12/2013 | Hinton | G06F 21/41 726/10 |
| 8,924,269 | B2* | 12/2014 | Seubert | G06Q 10/06 705/35 |
| 9,529,993 | B2* | 12/2016 | Kapadia | G06F 21/33 |
| 2006/0155716 | A1* | 7/2006 | Vasishth | G06Q 10/06 |
| 2007/0150934 | A1 | 6/2007 | Fiszman et al. | |
| 2008/0222096 | A1* | 9/2008 | Ungureanasu | G06F 17/30412 |
| 2009/0183175 | A1* | 7/2009 | Walker | G06Q 10/10 719/313 |
| 2011/0162034 | A1* | 6/2011 | Nagaratnam | G06F 21/604 726/1 |
| 2012/0191716 | A1* | 7/2012 | Omoigui | H01L 27/1463 707/740 |
| 2014/0075492 | A1* | 3/2014 | Kapadia | H04L 63/102 726/1 |
| 2015/0135257 | A1 | 5/2015 | Shah et al. | |
| 2015/0200943 | A1 | 7/2015 | Pitre | |
| 2015/0200971 | A1 | 7/2015 | Nishizawa et al. | |

OTHER PUBLICATIONS

Cerri, Davide, et al., "Bridging the Gap between User Attributes and Service Policies with Attribute Mapping", CEC 2009, Vienna, Austria, Jul. 20-23, 2009, IEEE Computer Society, pp. 154-161.*

* cited by examiner

IDENTITY-TO-ACCOUNT CORRELATION AND SYNCHRONIZATION

BACKGROUND

The disclosure generally relates to the field of identity and access management systems, and more particularly to correlating and synchronizing identity profile information with account profile information to generate system access synchronization policies.

Identity and Access Management (IAM) systems generally employ information sharing mechanisms and techniques to efficiently manage user identity profiles and the relation of the identity profiles with accounts profiles. In the context of an IAM system, an identity profile generally includes authentication information that is associated with a single consumer entity (e.g., a user) and that is applicable within a particular IAM to one or more consumer accounts. Consumer accounts include account profiles for accessing hardware resources (e.g., a storage device), system software components (e.g., a virtual machine), application software components, or any combination of the foregoing (e.g., applications installed or otherwise accessible from a computer workstation). Information within account profiles may include consumer description information and information for authenticating or otherwise identifying the consumer entity including information regarding access level authorizations.

The extent of access enabled by a given identity profile is determined based on the configuration and reconfiguration of the identity profile and account profiles within a given access management domain. An IAM manager determines accessibility and level of accessibility to a given system endpoint (e.g., desktop client application) within the domain based on relations and associations between identity information in the universally applicable identity profiles and corresponding identity information within account profiles. The correspondence between the identity profile information and the identity information maintained in association with each of the system resource account profiles is established by authentication rules. Runtime enforcement of the identity-to-account correspondence is governed by synchronization policies that enable the IAM manager to update identity information in response to the same or other identity information being added or modified within the identity and account profiles.

Establishing and utilizing identity-to-account data correlations typically requires associating specified attributes of the identity profiles with corresponding attributes of one or more of the account profiles. Such profile attributes are the primary constituent components of the identity and account profiles. For example, an identity profile may comprises attributes in the form of defined data fields including a "NAME" field and an "EMPLOYEE ID" field. An account profile also includes attributes in the form of fields such as "FULL NAME," "UID," etc. While effective for establishing profile information synchronization to enable efficient IAM operations, several issues arise relating to the efficiency of configuring and synchronizing profiles in expansive and heterogeneous IAM domains.

BRIEF DESCRIPTION OF THE DRAWINGS

Embodiments of the disclosure may be better understood by referencing the accompanying drawings.

DESCRIPTION

The description that follows includes example systems, methods, techniques, and program flows that depict embodiments of the disclosure. However, it is understood that this disclosure may be practiced without these specific details. In some instances, well-known instruction instances, protocols, structures and techniques have not been shown in detail in order to avoid obfuscating the description.

The embodiments disclosed herein relate to discovery and runtime processing of information utilized by system resource access managers to enable controlled resource access. The categories of access control information include identity information associated with identity profiles and identity information associated with account profiles. As utilized in the context of one or more of the disclosed embodiments, identity refers to a portion or all information that is directly associated with a person or an organizational entity and that is included in an identity profile for a given access management domain. Identity profile information may include alphanumeric codes or other computer processed data such as biometric data. Such identity profile information (referred to herein also as identity attribute information) is utilized to determine the identity of a system resource consumer. Account profile information is another category of identity information distinct from identity profile information. Account profile information (referred to herein also as account attribute information) refers to a portion or all information directly associated with a system resource consumer (e.g., a person or an organizational entity) that is included within an account profile that intrinsically associates identity information with one or more access domain system resources.

Figure 1:
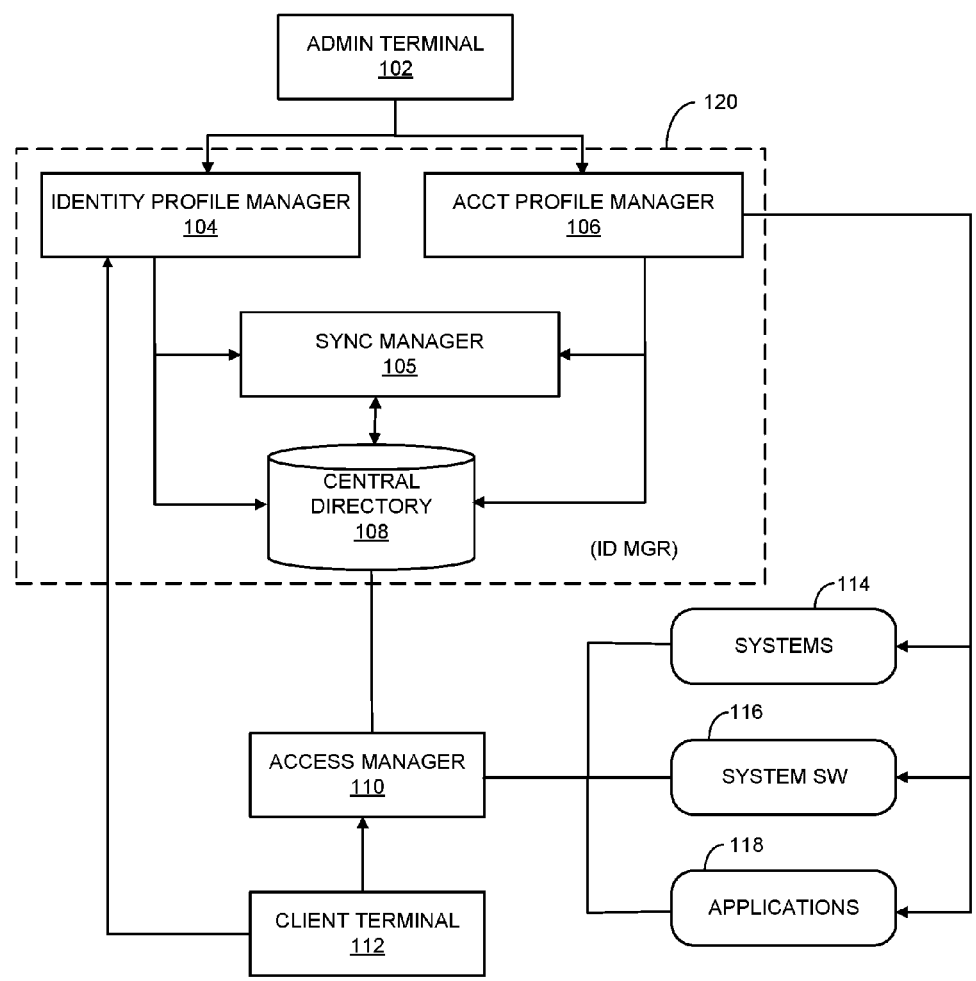
FIG. 1 is a block diagram depicting an identity and access management system in accordance with an embodiment.

FIG. 1 is a block diagram depicting an identity and access management system in accordance with an embodiment. The system includes an identity manager 120 that collects and processes identity profile information and account profile information, which may be administratively entered at an administrative ("admin") terminal 102 and/or a client terminal 112. The identity profile information for users and organizational entities may include names and other descriptive information such as employee ID, birth date, biometric data, etc. The account profile information includes some of the same or similar information as in identity profiles, but is intrinsically associated by the individual account profile records with a level of access to one or more system resources. Generally, the identity management function performed by identity manager 120 enables secure and efficient access to domain resources including systems 114, system software 116, and applications 118. Such access is ultimately governed by an access manager 110, which applies access policies to the respective identity and account profile information to enable access such as via client terminal 112 to one or more components within systems 114, system software 116, and applications 118. In combination, identity manager 120 and access manager 110 apply the identity and account profile information to systems and services over the life cycle of each of multiple identity profiles from initial registration, through modifications, and until removal from the system. Single Sign-On (SSO) is an example implementation of identity management such as may be performed by identity manager 120. SSO utilizes a centralized authentication process to enable access to multiple applications and services. SSO may integrate multiple authentications for multiple system resources in a domain such as a specified computer platform or network.

In the depicted embodiment, identity manager 120 includes an identity profile manager 104 and an account profile manager 106. Identity profile manager 104 comprises program instructions, data structures, and other components for receiving and processing identity information transmitted from client terminal 112 and/or admin terminal 102. For example, a system administrator may enter a new identity profile as a file, record, or other logically accessible data object, which includes information that describes attributes of the subject user or organizational entity. In another example, a user may access identity profile manager 104 to modify an identity profile such as by adding or modifying identity attribute information. Identity profile manager 104 may persistently store multiple identity profiles within its system-specified storage allocation or may store and access the identity profiles within a central directory 108. Account profile manager 106 comprises program instructions, data structures, and other components for receiving and processing user/entity identification information that is stored in account profiles that expressly (i.e., by data associations within the profile data object) or inherently (i.e., by external logical association of each account profile with a specified system resource) associates a specified user/entity with a specified system resource. The account profile information may be transmitted to account profile manager 106 from client terminal 112 and/or admin terminal 102. For example, a system administrator may enter a new account profile as a file, record, or other logically accessible data object, which includes information that describes attributes of the subject user or organizational entity. In another example, a user may access account profile manager 106 to modify an account profile such as by adding or modifying account attribute information. Similar to identity profile manager 104, account profile manager 106 may persistently store multiple account profiles within its storage allocation or may store and access the identity profiles within the central directory 108.

Identity manager 120 further includes a synchronization manager 105 that synchronizes identity profiles managed by identity profile manager 104 and account profiles managed by account profile manager 106. In an embodiment, synchronization manager 105 comprises program instructions, data structures, and other components for implementing a multi-phase discovery/run-time procedure that ultimately synchronizes data between individual identity profiles and individual account profiles. The process begins with a discovery phase in which one or more account profile schemas are mapped to one or more identity profile schemas. As utilized herein, a schema (identity or account) represents an organized structure or pattern of data and/or data structures within a profile (identity or account) data structure. An identity profile schema refers to structural aspects of identity attribute fields such as field ID, field type, etc. of fields included within one or more individual identity profiles that share the same schema. For example, an identity profile schema may comprise a listing of field IDs having corresponding field lengths, data types, and other structural characteristics for containing information that describes users/entities within an access management domain. An account profile schema refers to structural aspects of account attribute fields such as field ID, field type, etc. of fields included within one or more individual account profiles that share the same schema. For example, an account profile schema may comprise a listing of field IDs having corresponding field lengths, data types, and other structural characteristics for containing information that describes users/entities, which per a resource access account underlying the profile, have access to specified resources within the access management domain.

The discovery phase implemented by synchronization manager 105 fundamentally entails mapping fields (also referred to herein as attribute fields) of account profiles to attribute fields of identity profiles or vice versa. To generate the field mapping associations, synchronization manager 105 processes data stored in the various attribute fields of the respective identity and account profiles in combination with the respective attribute field identifiers (IDs). For example, synchronization manager 105 may initially access a number of identity profiles and account profiles which may be retrieved/read from the central directory 108. During the discovery phase, synchronization manager 105 iteratively compares data in each of the identity attribute fields with data in each of the account attribute fields for each of the accessed identity and account profiles. For instance, consider multiple selected identity profiles that each include data contained in attribute fields having respective field IDs FIRST NAME, LAST NAME, FULL NAME, and EMPLOYEE ID. Synchronization manager 105 compares the data contained within these fields for each of the selected identity profiles with data contained in the attribute fields of each of the selected account profiles. For selected account profiles having field IDs EID, NAME, FIRST NAME, and SURNAME, synchronization manager 105 compares data stored under FIRST NAME for each of the identity profiles with data stored under EID, NAME, GIVEN NAME, and SURNAME for each of the selected account profiles. Synchronization manager 105 continues this process iteratively until the data stored in the remaining identity attribute fields have similarly been compared with the data in each of the account attribute fields for each of the selected account profiles.

The results of the iterative one-to-n comparisons are recorded as correlation values that may be utilized to generate attribute field mapping rules that map the respective attribute fields of the account profile schema to attribute fields of the identity profile schema. In an embodiment, synchronization manager 105 may generate and/or increment attribute correlation values corresponding to detected matches between data contained in identity attribute fields and account attribute fields. For example, synchronization manager 105 may generate a table or other associative, array-type data structure that stores the respective counts of attribute correlation values for each of the identity-attribute-field/account-attribute-field pairs that are processed together as part of the aforementioned iterative field comparisons. Returning to the foregoing example identity and account attribute field IDs, attribute correlations values may be stored and updated during the discovery phase for attribute pairs including FIRST NAME/EID, FIRST NAME/NAME, FIRST NAME/GIVEN NAME, and FIRST NAME/SURNAME. Similarly, attribute field ID pairs and associated attributed correlation values are recorded for the other identity and account attribute fields IDs.

After computing the attribute correlation values for each of the attribute field pairs, the discovery phase continues with synchronization manager 105 comparing the attribute correlation values to determine the attribute field mapping rules. Synchronization manager 105 may compare sets of attribute correlation values that are associated with the same identity attribute field or the same account attribute field. Returning to the example, a set of attribute correlation values to be compared may comprise the values corresponding to the FIRST NAME/EID, FIRST NAME/NAME, FIRST NAME/GIVEN NAME, and FIRST NAME/SURNAME attribute field pairs. For each of the sets of attribute field pairs, synchronization manager 105 determines one or more dominant correlation values based on the comparisons within the respective sets. The dominant correlation value(s) are then utilized to generate the attribute field mapping rules that may comprise logical or otherwise operative associations, such as pointers, between corresponding attribute field identifiers. Synchronization manager 105 may execute or otherwise indirectly apply logic rules to determine one or more dominant attribute correlation values for each set. For example, the logic rules may be configured to identify a single dominant correlation value in each set based on comparisons or other operations that determine a largest value in the set. Selecting a largest value to be utilized to generate an attribute field mapping rule may further depend on determining whether the largest value exceeds a specified threshold. Using the foregoing example and assuming a dominant correlation value is generated and identified for the FIRST NAME/GIVEN NAME pair, a corresponding attribute field mapping rule may be expressed as R1: FIRST NAME->GIVEN NAME. The logic rules applied by synchronization manager 105 may also or alternatively be configured to identify one or more correlation values that, based on exceeding a specified threshold, may be utilized to generate one or more one-to-one and/or one-to-m attribute field mapping rules.

During a run-time phase, synchronization manager 105 may utilize the attribute field mappings generated during one or more discovery phases to synchronize identity profile data with account profile data for all identity and account profiles within an access management domain. The run-time phase includes identifying accurate pairings between identity profiles and account profiles based, at least in part, on the attribute field mapping rules. The intent of this portion of the run-time phase is to correctly map all account profiles that intrinsically associate with a given user/entity with various system resources to the identity profile for that user/entity. The run-time phase further includes using the identified account-to-identity profile associations together with the attribute field mapping rules to synchronize data within the profiles as described in further detail with reference to FIGS. 2-6.

Figure 2:
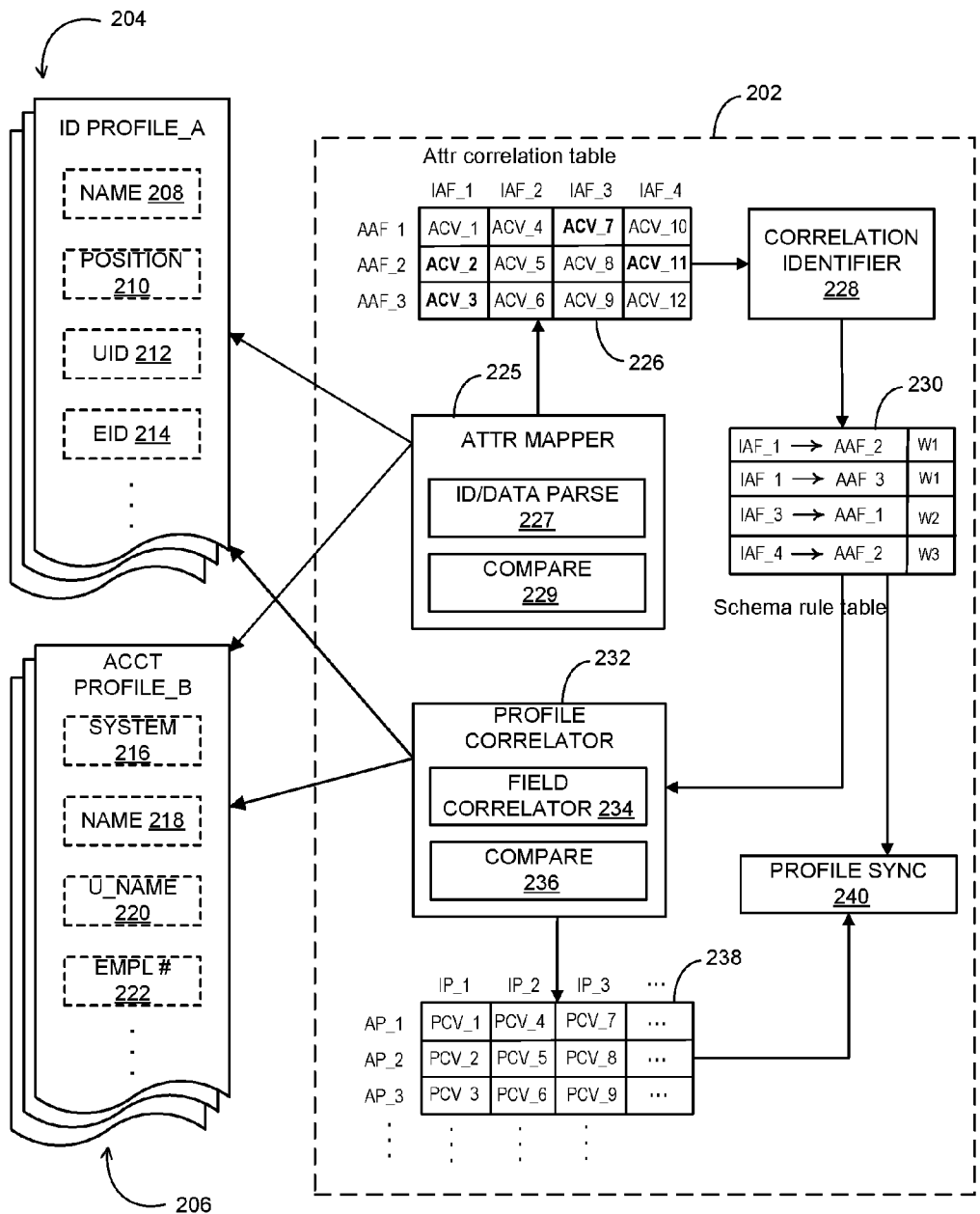
FIG. 2 is a block diagram illustrating a profile synchronization manager in accordance with an embodiment.

FIG. 2 is a block diagram illustrating a synchronization manager 202 for synchronizing identity profiles 204 and account profiles 206 in accordance with an embodiment. In an embodiment, identity profiles 204 and account profiles 206 comprise the set of identity and account profiles for a single endpoint system instance. In such a case, account profiles 206 comprise the set of account profiles utilized to manage access from a given endpoint system, such as a desktop manager client, and identity profiles 204 comprise the set of identity profiles utilized for managing access to resources in the same given endpoint system. In another embodiment, identity profiles 204 and account profiles 206 comprise the set of identity and account profiles for an access management domain spanning multiple endpoint system instances. Identity profiles 204 may be associated with zero, one, or more of account profiles 206. Identity profiles 204 comprise multiple identity profiles that are each represented as a file, record, table, or other distinctly accessible data object that records various user/entity ID attribute values that are all associated with a single user/entity. The attribute values are stored as data within respective identity attribute fields that each have respective identity attribute field identifiers. Collectively, the identity attribute fields and corresponding identity attribute field identifiers form an identity profile schema. For example, identity profiles 204 includes an identity profile, ID PROFILE_A, that comprises a schema including identity attribute fields NAME 208, POSITION 210, UID 212, EID 214, among others not depicted. Each field contains data associated with a respective one of the field identifiers that are represented as "NAME," "POSITION," "UID," and "EID." One or more of the other of identity profiles 204 may share the same schema and others may have schemas that overlap (include some but not all of the same attribute fields). Some of identity profiles 204 may have entirely different schemas.

Account profiles 206 comprise multiple account profiles that are each represented as a file, record, table, or other distinctly accessible data object that records various user/entity ID attribute values. By virtue of their structure and/or logical processing by synchronization manager 202 and/or other access management components, the user/entity ID attribute values within account profiles 206 are intrinsically associated with one or more system resources such as a computer terminal, an application, etc. The attribute values are stored as data within respective account attribute fields that each have respective account attribute field identifiers. Collectively, the account attribute field identifiers form an account profile schema. For example, account profiles 206 includes an account profile, ACCT PROFILE_B, that comprises a schema including account attribute fields SYSTEM 216, NAME 218, U_NAME 220, and EMPL #222, among others not depicted. Each field contains data associated with a respective one of the field identifiers that are represented as "FN," "SYS ROLE," "U_NAME," and "EMPL #." One or more of the other of account profiles 206 may share the same schema and others may have schemas that overlap (include some but not all of the same attribute fields). Some of account profiles 206 may have entirely different schemas.

Identity profiles 204 and account profiles 206 may represent a portion or all of the identity and account profiles manage by an endpoint system or managed within an access management domain comprising multiple endpoint systems. Synchronization manager 202 processes the native (i.e., structural) and external (e.g., entered by a client) information within the profiles to enable efficient synchronization between account and identity profiles. To this end, synchronization manager 202 comprises an attribute mapper 225 and a profile correlator 232. Attribute mapper 225 generally comprises program instructions, data, and data structures for retrieving or otherwise receiving and processing one or more attribute fields within identity profiles 204 and account profiles 206. Namely, attribute mapper 225 comprises an ID/data parser 227 that parses and identifies constituent components of each of identity profiles 204 and account profiles 206 to identify and logically associate attribute field data and corresponding attribute field IDs. Attribute mapper 225 further comprises a compare module 229 that processes the field data and associated attribute field IDs output from ID/data parser 227 to determine data matches between identity attribute fields and account attribute fields. For example, the data identified by ID/data parser 227 within attribute fields 208, 210, 212, and 214, may comprise text strings "James Smith," "System_1_Manager," "Smith.sys_1," and "6823D4," respectively. ID/data parser 227 associates the attribute field IDs "NAME," "POSITION," "UID," and "EID," with the corresponding text strings and provides the resultant associated data to compare function module 229. Similarly for ACCT PROFILE_B, the data identified by ID/data parser 227 within attribute fields 216, 218, 220, and 222, may comprise text strings "System1," "James A Smith," "Smith.sys_1," and "6823D4," respectively. ID/data parser 227 associates the attribute field IDs "FN," "SYSTEM," "U_NAME," and "EMPL #," with the corresponding text strings and provides the resultant associated data to compare module 229.

To determine attribute correlations between identity and account profiles, compare module 229 processes the associated data/ID pairs for each of the identity attribute fields with the associated data/ID pairs for each of the account attribute fields. In an embodiment, the processing of identity with account attribute field data is performed, in part, as a series of iterative comparisons of the respective field data using a matching function. Compare module 229 may utilize a text string matching function that compares individual characters and symbols constituting the text strings identified by ID/data parser 227 as the respective data within the identity and account attribute fields. In addition or alternatively, compare module 229 may utilize a matching function that compares other types of data such as encoded biometric data. Regardless of what data types are compared, the manner in which the matching function determines whether or not a match exists may vary. For example, compare module 229 may be programmed or otherwise logically configured to determine exact matches (e.g., identical symbol sequence between strings). Compare module 229 may additionally or alternatively be programmed to identify matching field data based on a similarity algorithm. For example, the matching function may determine an edit distance (string dissimilarity) by determining the minimum number of operations required to transform one field data string to match the other field data string. In another example, the matching function may disregard some aspects of dissimilarity between the field data such as upper or lower case. In the depicted embodiment, compare module 229 iteratively compares each and every of the text strings, "System1," "James A Smith," "Smith.sys_1," and "6823D4," with each and every of the text strings "James Smith," "System_1_Manager," "Smith.sys_1," and "6823D4" using a text string matching function. The results of each of these comparisons are accumulated with similar comparisons for multiple other identity and account profiles to determine whether a sufficient correlation exists between identity and account attribute data that can be used to establish mappings between attribute fields for a specified identity profile schema (e.g., profile schema applied by ID PROFILE_A) and a specified account profile schema (e.g., profile schema applied by ACCT PROFILE_B).

Attribute mapper 225 records the results of the iterative attribute field data comparisons in an associative two-dimensional array within an attribute mapping table 226. The array formed by attribute mapping table 226 includes columns that are each associated with a respective identity attribute field and rows that are each associated with a respective account attribute field. In an embodiment, each of the columns are associated with a respective identity attribute field ID such as determined by ID/data parser 227 and each of the rows are associated with a respective account field ID. In the depicted embodiment, the identity profile columns are associated with identity attribute field IDs IAF_1 through IAF_4. The account profile rows are associated with account attribute field IDs AAF_1 through AAF_3. The array entries comprise attribute correlation values ACV_1 through ACV_12 that may be initialized prior to the attribute field correlation phase at a zero value. During the iterative field data comparisons described above, attribute mapper 225 increments one of the attribute correlation values in response to compare module 229 determining a match between data in a particular identity attribute field and data in a particular account attribute field.

Following the iterative comparisons and resultant incrementing of the attribute correlation values, a correlation identifier module 228 compares attribute correlation values within sets that are each associated with one identity attribute field identifier, which in the depicted embodiment corresponds to a single column. Correlation identifier module 228 compares the attribute correlation values within each of the four sets in which each member of each set is associated with the same identity attribute field identifier IAF_1, IAF_2, IAF_3, or IAF_4. The attribute correlation values in each set are compared to determine one or more dominant correlation values, which in one embodiment corresponds to a largest attribute correlation value within a set. In addition or alternatively, a correlation threshold value may be used to identity the dominant correlation value(s). For instance, all correlation values exceeding the threshold value may be identified by correlation identifier 228 as dominant. In either case, correlation identifier 228 may use a threshold value to filter out invalid correlation values such as may result from incidental data similarities between otherwise distinct attribute fields. For example, a matching function may determine a match between the data string "Paris" contained in both an identity attribute field and an account attribute field in which the identity attribute field is associated with a "City" ID and the account attribute field is associated with a "First Name" ID. In such an embodiment, the dominant correlation value is based on the previously described correlation value comparisons and on whether a correlation value meets a specified threshold value.

In response to determining dominant attribute correlation value(s) for a given set, correlation identifier 228 generates one or more mapping rule entries in a schema rule table 230. The mapping rule entries generally comprise attribute mapping rules that logically associate an identity attribute field for a given identity profile schema with one or more account attribute fields for a given account profile schema, depending on how many dominant correlations were identified. As shown in FIG. 1, the attribute field mapping rules within schema rule table 230 include four logically associated pairs of identity and account attribute field identifiers, IAF_1->AAF_2, IAF_1->AAF_3, IAF_3->AAF_1, and IAF_4->AAF_2. Correlation identifier 228 generates these rules based on dominant correlations identified respectively within the ACV_2, ACV3, ACV_ACV_7, and ACV_11 entries within attribute correlation table 226. In an embodiment, identity and account attribute field identifiers determined by ID/data parser 227 are utilized by correlation identifier 228 to generate the logical associations.

During a run-time phase, the attribute field mapping rules generated during a discovery phase may be utilized by synchronization manager 202 to synchronize field data between identity and account profiles. The run-time phase begins with a profile correlator 232 accessing identity profiles 204 and account profiles 206 and applying the attribute field mapping rules within schema rule table 230 to determine, for a given account profile schema, which account attribute field data will be compared with which identity attribute field data for a given identity profile schema. Profile correlator 232 comprises a field correlator 234 and a compare module 236. Field correlator 234 comprises program instructions, data, and data structures for accessing an identity profile, such as ID PROFILE_A, as well as accessing the attribute field mapping rules within schema rule table 230. In an embodiment, field correlator 234 reads one or more of the identity attribute field IDs within a given identity profile and applies one or more of the attribute field mapping rules to identify a corresponding account attribute ID. Compare module 236 then utilizes a matching function to compare data in the respective account attribute fields of account profiles 206 that have the identified account attribute ID with data in the identity attribute field for the given identity profile. The matching function used by compare module 236 may be the same as or different from the types of matching functions described with reference to compare function 229. For each comparison, compare module 236 determines whether a match exists and if so, compare module 236 increments a profile correlation value within a profile mapping table 238. As shown in FIG. 2, profile mapping table 238 embodies an associative two-dimensional array of profile correlation values PCV_1 through PCV_9 that are each associated column-wise with an individual identity profile and row-wise with an individual account profile. Compare module 236 may repeat this process for one or more additional of the identity attribute fields included in the identity profile schema for the given identity profile, such as ID PROFILE_A, to accumulate a total of zero to n increments to the profile correlation value that corresponds to the identity profile and a given account profile.

Compare module 236 performs this process for multiple identity profiles to determine total profile correlation values between each of identity profiles 204 and each of account profiles 206. In one aspect, a profile correlation value for a given identity profile/account profile pair is essentially a cumulative count of attribute field pairs that are selected for mutual comparison based on the attribute field mapping rules and identified as matching based on the data content similarity of the respective attribute fields. In an embodiment, the profile correlation values may be weighted to account for differences in efficacy between different attribute pairs in determining a reliable correlation between identity and account profiles. To this end, the attribute field mapping rules within schema rule table 230 are each to be associated with weighting factors W1, W2, and W3, respectively. Profile correlator 232 applies the weighting factors to determine the increment values in response to matches determined by compare module 236. Together the weighted profile correlation values within profile mapping table 238 logically associate one or more of account profiles 206 with each of identity profiles 204.

The run-time phase further includes synchronizing field data between identity profiles 204 and account profiles 206. In the depicted embodiment, the recorded profile correlation values within profile mapping table 238 together with the attribute field mapping rules within schema rule table 230 are processed by a profile synchronizer 240 to perform such synchronization. For instance, profile synchronizer 240 may execute a one-time or periodic global synchronization cycle in which the profile correlation values within profile mapping table 238 are utilized to first determine which of account profiles 206 are to be synchronized with respect to one or more of identity profiles 204. Having determined the account-profile-to-identity-profile associations (zero-to-one, one-to-one, n-to-one), profile synchronizer applies the attribute field mapping rules within schema rule table 230 to, for example, update data within attribute fields of account profiles 206 with data contained in the attribute fields of the associated identity profiles 204.

Figure 3:
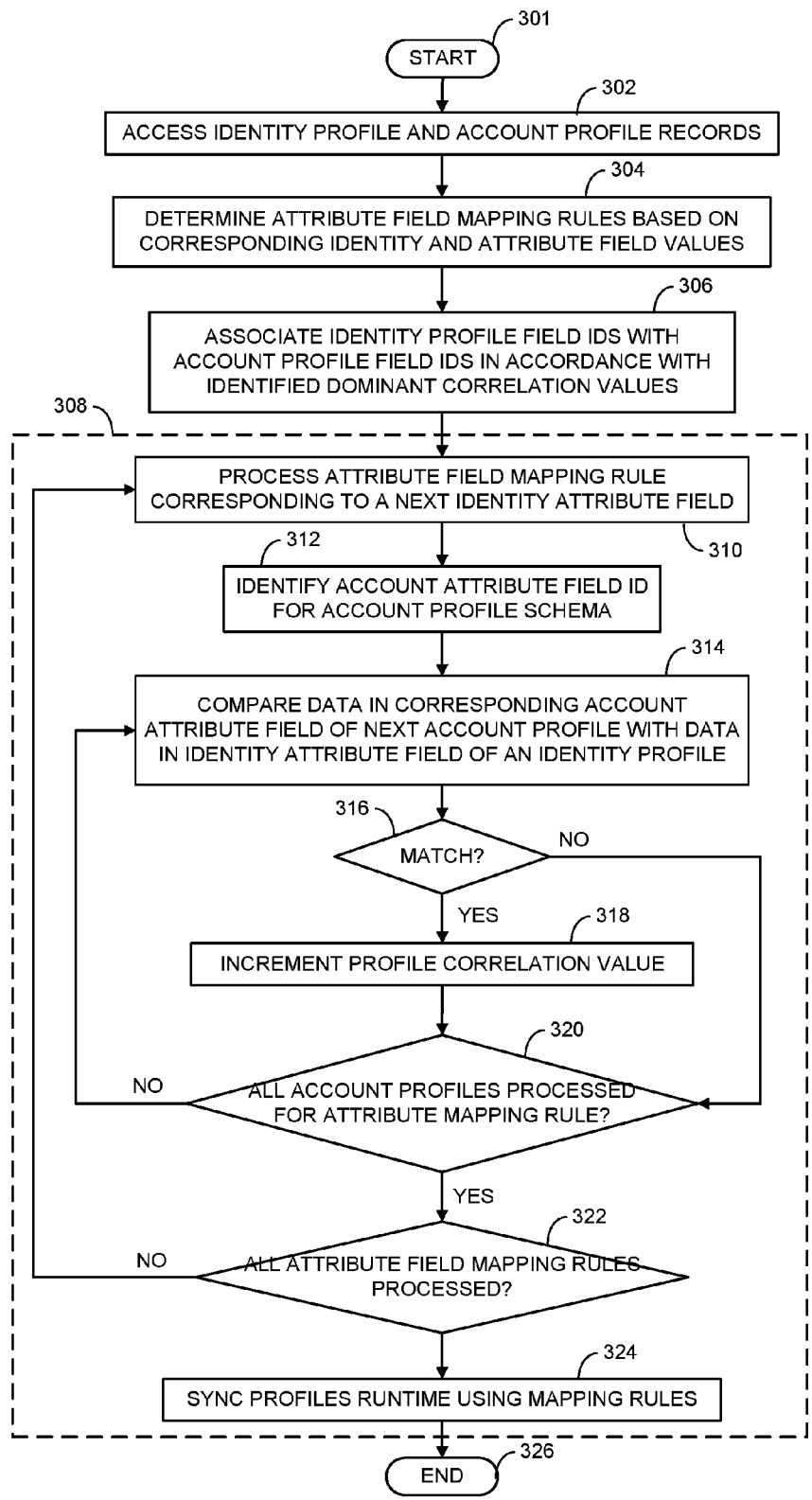
FIG. 3 is a flow diagram illustrating operations and functions for managing identity and account profiles within an access management domain in accordance with an embodiment.

FIG. 3 is a flow diagram illustrating operations and functions for managing identity and account profiles within an access management domain in accordance with an embodiment. The process begins at block 301 and proceeds to block 302 with a synchronization manager commencing a discovery phase by accessing identity profiles and account profiles that each have a specified profile schema. The selection of which and how many identity and account profiles to process during the discovery phase may vary depending on the numbers of total identity and/or account profiles that are stored within the access management system. In an embodiment in which the number of identity and/or account profiles is very large, a specified sample size of a number of identity and/or account profiles may be used to determine how many profiles are accessed at block 302. For example, sample numbers of identity and account profiles may be determined based on statistical analysis of the total number of identity and/or account profiles managed by an endpoint system or within an access management domain comprising multiple endpoint systems. The selection of individual profiles to be included in the sample may be performed pseudo randomly or may be a structured selection. For instance, identity and/or account profiles may be selected based on specified names or other identifiers. In another example, the selection may be performed as a stratified sampling (e.g., selecting n identity and/or account profiles from each of multiple organizational units). In some cases, a particular endpoint system may have insufficient numbers of identity and/or account profiles from which to reliably determine profile schema attributed correlations. In such a case, the synchronization manager may obtain addition sample identity and/or account profiles having the same schemas from other endpoints/domains.

At block 304 the synchronization manager generates or otherwise determines attribute field mapping rules based, at least in part, on attribute data comparisons made between identity and account attribute fields. In an embodiment described in further detail with reference to FIG. 4, the synchronization manager iteratively compares data in each of the identity attribute fields with data in one or more of each of the account attribute fields. In an embodiment, the attribute field mapping rules are generated based on dominant correlation values that are identified in accordance with cumulative results of the comparisons. In association with the attribute field mapping determinations, and as part of generating the field mapping rules, the synchronization manager logically associates attribute field IDs of the identity profiles with attribute field IDs of the account profiles based on the identified dominant correlations (block 306).

At superblock 308, the synchronization manager commences a run-time phase that correlates and synchronizes the identity and account profiles based on the attribute field mapping rules. In an embodiment in which a sample number of identity and account profiles were processed at blocks 302 through 306, the run-time phase superblock 308 is applied to those same profiles as well as additional identity and account profiles within the access management domain. The runtime phase begins as shown at block 310 with the synchronization manager processing an attribute field mapping rule corresponding to a next identity attribute field of a given identity profile. In an embodiment, the attribute mapping rule may be identified or otherwise selected by matching an identity attribute field ID of the identity attribute field with a field ID specified by the attribute mapping rule. As a result of processing the attribute field mapping rule, the synchronization manager identifies an account attribute field ID specified by the mapping rule as associated with the identity field attribute ID (block 312). Next, at block 314, the synchronization manager compares data within an attribute field of a next account profile that corresponds to the identified account attribute field ID with data in the identity attribute field processed at block 310.

At block 316, the synchronization manager determines whether a match exists based on the comparison at block 314. In an embodiment, the match may be a full or partial match of the data depending on the matching function used for the comparison. In response to determining a match, the synchronization manager increments or otherwise adds a profile correlation value at block 318. The profile correlation value that is added or incremented is logically associated with the account profile and the identity profile from which the respective attribute field values were compared at block 314. The size/magnitude of the increment or added profile correlation value may depend on a weighting factor associated with the attribute field mapping rule processed at block 310. Following block 318, or in response to determining no match at block 316, the process continues at block 320 with the synchronization manager determining whether the attribute field values for all account profiles that are associated with the account attribute field identified at block 312 have been processed via blocks 314 and 316. Control continues to return to 314 until the synchronization manager determines that all account profiles have been processed per the mapping rule that is applied to one attribute field of one identity profile and a corresponding attribute field for all account profiles.

Once all account profiles have been processed for a given attribute mapping rule, the process continues with the synchronization manager determining whether all attribute field mapping rules have been processed (block 322). If so, a profile mapping table or its equivalent has been generated and control passes to block 324 at which the synchronization manager synchronizes data between the identity profiles and the account profiles prior to or during runtime operations. In an embodiment, the synchronization manager uses the profile correlation values in combination with the attribute field mapping rules as a guide to determine for a given attribute field of a given identity profile, which account profiles and which attribute field(s) therein should be accessed for data synchronization. If, as determined at block 322, attribute field mapping rules remain unprocessed, control passes back to block 310 to begin processing another of the identity profile fields and the account profiles as previously described. The process is represented as ending at block 326.

Figure 4:
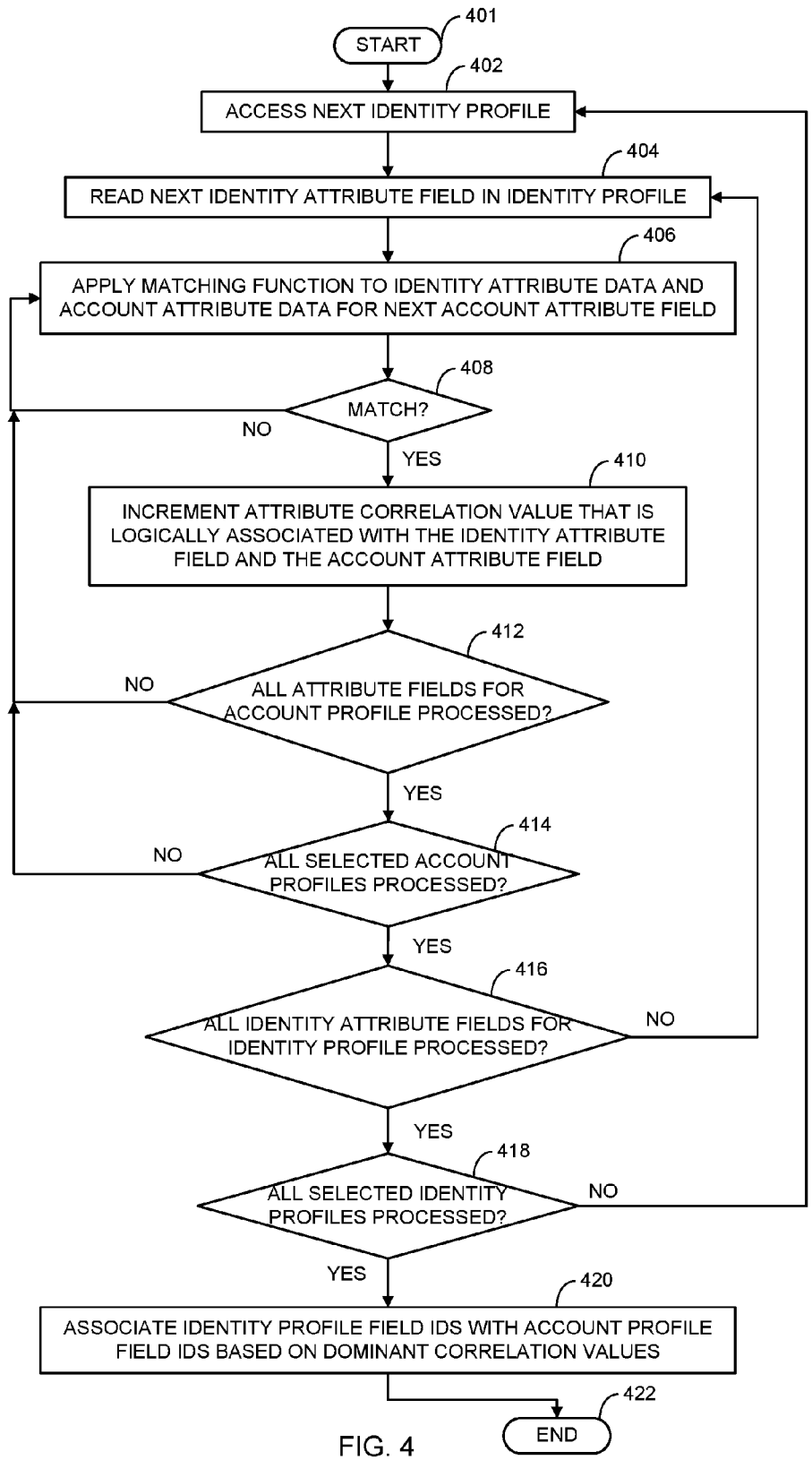
FIG. 4 is a flow diagram depicting operations and functions for determining attribute field mappings for identity and account profiles in accordance with an embodiment.

FIG. 4 is a flow diagram depicting operations and functions for determining attribute field mappings for identity and account profiles in accordance with an embodiment. For example, the operations and functions depicted in FIG. 4 may be applied during a discovery phase such as depicted at blocks 302-306 of FIG. 3. The process begins at block 401 and proceeds at blocks 402 and 404 with a synchronization manager reading a next (e.g., a first initially, a second following the first, etc.) identity attribute field within a next identity profile. At block 406, the synchronization manager reads, executes, or otherwise applies a compare matching function to determine whether a match exists between the identity attribute field data and data in a next account attribute field. In response to determining a match, the synchronization manager increments an attribute correlation value that is logically associated with identity attribute field (schema field) and the account attribute field (schema field). In an embodiment, the logical association is implemented via an associative data array object such as a two-dimensional associative table in which the attribute correlation value entry is uniquely associated with the identity attribute field ID and the account attribute field ID. The iterative process continues at block 412 with the synchronization manager determining whether all attribute fields for the current account profile schema have been processed. If not, control passes back to block 406 with the synchronization manager applying the matching function to determine whether a match exists between the same identity attribute field data and data in a next account attribute field.

The process from block 406 through 412 continues until all attribute fields for a given account profile have been compared with an attribute field of the identity profile at which point control passes to block 414. At block 414, the synchronization manager determines whether all selected account profiles have been processed against the identity attribute field. As explained with reference to block 302 of FIG. 3, the number and/or identity of account and/or identity profiles to be used for the discovery phase may comprise a subset of the entire set of domain profiles. Following each identity attribute field processing iteration (blocks 406-414), control continues to pass back to block 406 until all discovery phase account profiles have been processed.

Once all account profiles have been processed for a given identity attribute field iteration, control passes to block 416 with the synchronization manager determining whether all attribute fields for the currently processed identity profile have been processed. If not, control returns to block 404 with a next identity attribute field for the identity profile being read and processed at blocks 406-414. The processing of the attribute fields for the current identity profile continues until all have been processed and the next of the selected, discovery phase identity profiles is accessed at block 402 and processed through blocks 404-416. Once all of the selected, discovery phase account profiles and identity profiles have been processed through blocks 402-418, an attribute correlation table has been generated that stores the accumulated attribute correlation values that are each uniquely associated with an identity attribute field ID and an account attribute field ID. Once the synchronization manager determines that all of the selected, discovery phase identity phase profiles have been processes, control passes to block 420. At block 420, the synchronization manager generates attribute field mapping rules by logically associating identity attribute field IDs with account attribute field IDs based on dominant correlations determined from the accumulated attribute correlation values. The process ends at block 422.

Figure 5:
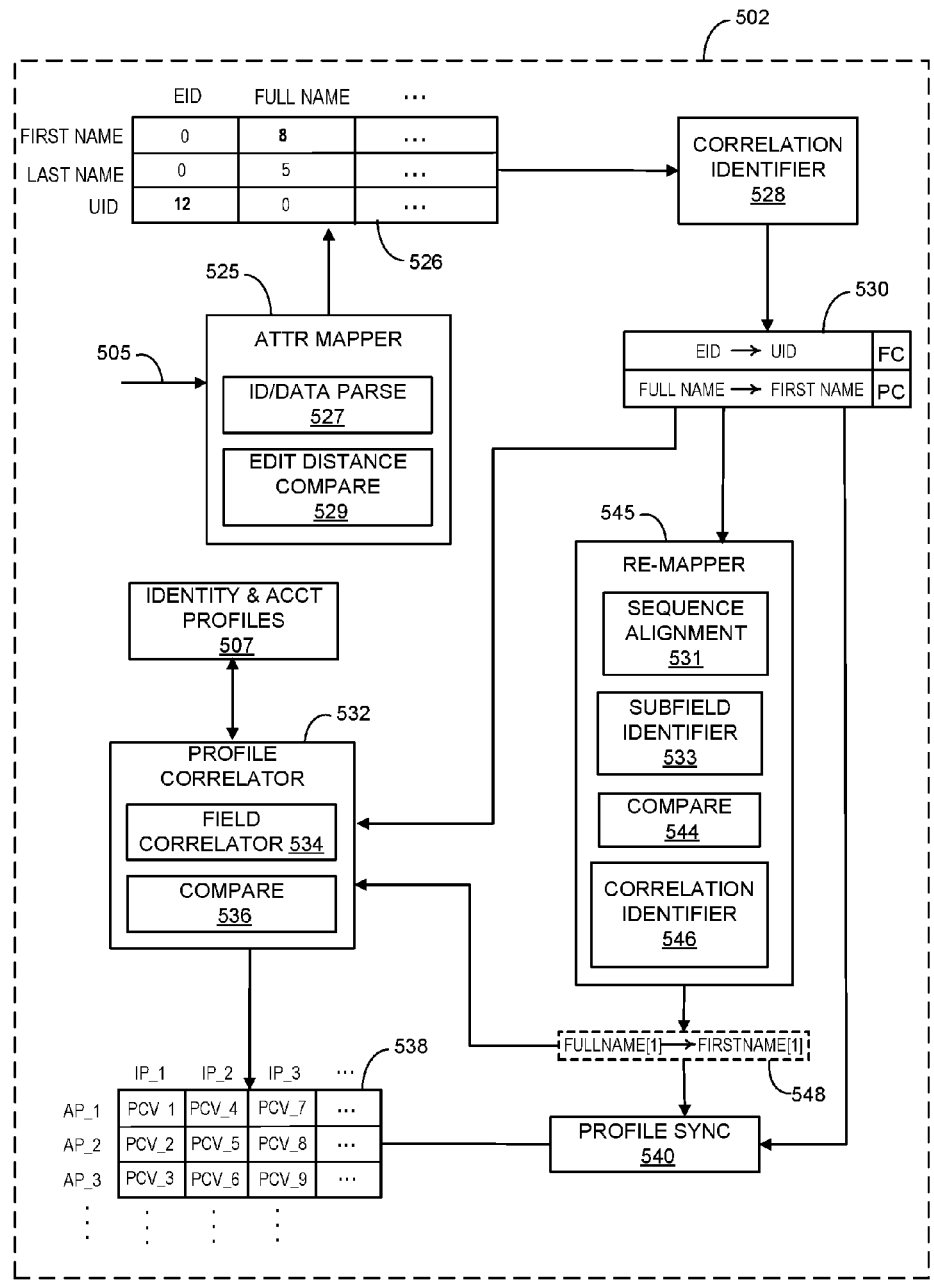
FIG. 5 is a block diagram illustrating a profile synchronization manager in accordance with an embodiment.

Some embodiments address situations in which attribute fields of identity and account profiles do not correspond in a one-to-one manner. For example, a FIRSTNAME attribute field and a LASTNAME attribute field in an account profile schema may each only partially map to a FULLNAME attribute field in an identity profile schema. FIG. 5 is a block diagram illustrating a synchronization manager 502 for synchronizing identity and account profiles in a manner that accounts for partially overlapping field data between identity and account attribute fields. In the depicted embodiment, synchronization manager 502 includes some of the same components as synchronization manager 202 described with reference to FIG. 2. Among such common components are an attribute mapper 525 and a profile correlator 532. Similar to FIG. 2, attribute mapper 525 includes an ID/data parser 527 and a compare module 529 for accessing and processing a complete or sample set of identity and account profiles received via an input 505 to generate an attribute correlation table 526. The attribute values processed by attribute mapper 525 include data contained within respective identity attribute fields that each have respective identity attribute field identifiers. Collectively, the identity attribute fields and corresponding identity attribute field identifiers form an identity profile schema, which in the depicted embodiment, includes identity attribute fields EID, FULL NAME, in addition to others not depicted. The corresponding identity attribute fields IDs are each associated with a respective column within attribute mapping table 526. Likewise, the account attribute fields and corresponding account attribute field identifiers form an account profile schema, which in the depicted embodiment, includes account attribute fields FIRST NAME, LAST NAME, and UID. The account attribute fields IDs are each associated with a respective row within attribute mapping table 526, which in association with the identity attribute field columns form an associative two-dimensional array generated as described with reference to FIGS. 2-4.

In the depicted embodiment, compare module 529 is configured to execute an edit distance matching function for comparing the identity and account attribute field data to determine data matches during a discovery phase. In executing the edit distance matching function, compare module 529 determines the minimum number of operations required to modify data within an attribute field (identity or account) to match the data in the other attribute field (identity or account) that is being compared. For instance, compare module 529 may apply the edit distance matching function to compare the text string "James A. Smith" in an identity attribute field with the text string "James" in an account attribute field. Compare module 229 may determine that a minimum of n operations are required modify "James" to identically match "James A. Smith." The value n may be compared with a match threshold value, m, to determine whether the identity and account field data match. To determine attribute correlations between identity and account profiles, compare module 529 applies the edit distance matching function and threshold value compare to the associated identity-attribute/account-attribute data pairs in the iterative manner described with reference to FIGS. 2 and 4. For each instance in which the determined edit distance is less than or equal to the specified threshold, attribute mapper 525 increments a corresponding attribute correlation value within table 526. The results of each of these comparisons are accumulated for multiple other identity and account profiles to determine whether a sufficient correlation exists between identity and account attribute data that can be used to establish mappings between attribute fields for a specified identity profile schema and a specified account profile schema.

Following the iterative comparisons and resultant incrementing of the attribute correlation values, a correlation identifier module 528 compares attribute correlation values within sets that are each associated with a single identity attribute field identifier. For instance, correlation identifier 528 may identify the attribute correlation value 12 in the EID identity profile column of table 526 as the single dominant value (as compared with the 0 correlation values in the same column) correlating the EID identity attribute field with the UID account attribute field. In response to identifying this correlation, correlation identifier 528 generates an attribute field mapping rule EID->UID within a schema rule table 530. In addition, correlation identifier 528 compares the dominant attribute correlation value, in this case 12, with a partial correlation threshold value, p, to determine whether the dominant correlation value is a full correlation or a partial correlation value. In the depicted embodiment, correlation identifier 528 determines that the dominant correlation value for the EID/UID attribute field pair meets or exceeds p and, in response, sets a full correlation flag, FC, in logical association with the mapping rule entry.

As shown by the attribute correlation values within table 526, the correlations between the FULL NAME identity field and the FIRST and LAST NAME fields are not as strong as between EID and UID. The attribute correlation value 8 is uniquely associated with the FULL NAME identity field and the FIRST NAME account field and is identified by correlation identifier 528 as a dominant correlation value by virtue of exceeding the correlation threshold value. Correlation identifier 528 therefore generates an attribute field mapping rule FULL NAME->FIRST NAME within schema rule table 530. The attribute correlation value of 5 associated with FULL NAME and LAST NAME is determined to be below the correlation threshold and is therefore not utilized to generate a mapping rule. In response to determining that the correlation value 8 does not meet or exceed the partial correlation threshold value p, correlation identifier 528 sets a partial correlation flag, PC, in association with the mapping rule entry.

During a run-time phase, the attribute field mapping rules generated during one or more discovery phases are utilized by synchronization manager 502 to synchronize field data between identity and account profiles. The run-time phase begins with profile correlator 532 accessing identity and account profiles 507 and applying the attribute field mapping rules within schema rule table 530 to determine, for a given account profile schema, which account attribute field data will be compared with which identity attribute field data for a given identity profile schema. For attribute mapping rules, such as the depicted EID->UID rule, which are associated with a full correlation indicator, profile correlator 532 and a profile synchronizer process the identity and account profiles as described with reference to FIGS. 2 and 4.

Attribute mapping rules, such as FULL NAME->FIRST NAME, which are associated with a partial correlation indicator, are pre-processed by a re-mapper 545 to generate mapping rules that are subsequently processed by profile correlator 532 and a profile synchronizer. Namely, re-mapper 545 identifies one or more of the attribute field mapping rules as representing partial attribute field correlations. Next, a sequence alignment module 531 performs a multiple sequence alignment on attribute field data corresponding to the identity and/or account attribute field IDs specified by the original attribute field mapping rule. For instance, consider the attribute field IDs FULL NAME and FIRST NAME specified by the mapping rule FULL NAME->FIRST NAME and having corresponding attribute field data. After re-mapper 545 reads the PC flag identifying the rule as representing a partial attribute field correlation, sequence alignment module 531 commences a multiple sequence alignment operation on multiple identity attributes and multiple account attributes. For example, the multiple sequence alignment of FULL NAME attributes "Nathan Hastings," "Steve Versteeg," "John Bird," and "Xien Yao," is represented as:

Nathan -Hastings
S-teve Versteeg-
Joh--n Bir-----d
Xie--n Ya------o

A multiple sequence alignment of account profile FIRST NAME attributes "Nathan," "Steve," "John," and "Xien," may be represented as:

Nathan
S-teve
Joh--n
Xie--n

The multiple sequence aligned identity and account attributes are processed by a subfield identifier 533 to compute a sequence prototype for each identity-field/account-field pair. Continuing with the foregoing example, the sequence prototype for the FULL NAME field is "????_????," wherein "?" represents a single variable character and "_" represents a delimiter constant (e.g., space character). The corresponding sequence prototype for the FIRST NAME field is "????." The sequence prototypes for each identity-field/account-field pair include zero, one, or more constant delimiter characters (e.g., space character "_") that divide the entire prototype field (e.g., "????_????" corresponding to the FULL NAME field) into one or more subfields (e.g., each variable character sequence "????").

Following computation of the sequence prototypes, subfield identifier 533 aligns attribute values to the sequence prototypes based on the delimiter characters. Continuing with the foregoing example, subfield identifier 533 may align the "Nathan Hastings" attribute with the "????_????" prototype resulting in:

Nathan Hastings
????--_????----

As depicted in the foregoing expression, the space delimiter, "_", is aligned between the attribute field data and the prototype, resulting in six character positions in which portions of the field data (i.e., letters "an" and "ings") are not aligned with the prototype. Without reading the complete attribute fields, subfield identifier 533 may determine each of the variable subfield values based on the characters that align to each of the prototype variable characters. In the above example, subfield identifier 533 determines that the first attribute subfield contains the text string "Nathan" based on the prototype aligned characters "Nath." Subfield identifier 533 may also determine that the second attribute subfield contains the text string "Hastings" based on the prototype aligned characters "Hast."

A compare module 544 receives the identity and account attribute field IDs associated with partial correlations (e.g., via mapping rule FULL NAME->FIRST NAME) together with the subfield values that have been identified via the alignments with the sequence prototype(s) and commences comparing field data between the identity and account profiles. In an embodiment, compare module 544 applies a matching function to compare each of the identity attribute field values with each of the account attribute field values and records the results in a correlation table (not depicted). For instance, compare module 544 may compare the first and second subfield data, (e.g., "Nathan" and "Hastings") corresponding to the identity attribute field ID, FULL NAME with the single subfield data (e.g., "Steve") corresponding to the account attribute field ID, FIRST NAME, and increment a partial attribute correlation value if a match is found. Continuing with the example, the resultant table may be represented as:

|  | FULL NAME[1] | FULL NAME[2] |
|---|---|---|
| FIRST NAME[1] | 8 | 0 | having an accumulated partial attribute correlation value of 8 uniquely associated with FULL NAME[1] (first FULL NAME subfield) and FIRST NAME[1] (the signal FIRST NAME field).

A correlation identifier module 546 compares the partial attribute correlation values within sets that are each associated with either an account attribute field or an identity attribute field identifier. Referring the foregoing partial attribute mapping table, correlation identifier module 546 compares the attribute correlation values corresponding to the FIRST NAME account attribute field and identifies 8 as the dominant value. In response, correlation identifier 546 generates, or remaps, the attribute correlation mapping rule FULL NAME->FIRST NAME into a partial attribute correlation mapping rule FULL NAME[1]->FIRST NAME[1] represented in FIG. 5 as within data structure 548. The attribute correlation values in each set are compared to determine one or more dominant correlation values, which in one embodiment corresponds to a largest attribute correlation value within a set. A correlation threshold value may also be used by correlation identifier 546 in a similar manner as described with reference to correlation identifier 228 in FIG. 2 to determine one or more dominant partial correlation values.

During a run-time phase, the attribute field mapping rules and partial attribute field mapping rules generated during a discovery phase may be utilized by profile correlator 532 and a profile synchronizer 540 to synchronize field data between identity and account profiles. The run-time phase begins with a profile correlator 532 accessing identity and account profiles 507 and applying the attribute field mapping rules within schema rule table 530 and within data structure 548 to determine, for a given account profile schema, which account attribute field data will be compared with which identity attribute field data for a given identity profile schema. Similar to profile correlator 232, profile correlator 532 comprises a field correlator 534 and a compare module 536. Field correlator 534 comprises program instructions, data, and data structures for accessing an identity profile, as well as accessing the attribute field mapping rules within schema rule table 530 and data structure 548. In an embodiment, field correlator 534 reads one or more of the identity attribute field IDs within a given identity profile and applies one or more of the attribute field mapping rules to identify a corresponding account attribute ID. Compare module 536 then utilizes a matching function to compare data in the respective account attribute fields that have the identified account attribute ID with data in the identity attribute field for the given identity profile. For each comparison, compare module 536 determines whether a match exists and if so, compare module 536 increments a profile correlation value within a profile mapping table 538. Similar to the profile mapping table depicted in FIG. 2, profile mapping table 538 embodies an associative two-dimensional array of profile correlation values PCV_1 through PCV_9 that are each associated column-wise with an individual identity profile and row-wise with an individual account profile. Compare module 536 may repeat this process for one or more additional of the identity attribute fields included in the identity profile schema for the given identity profile to accumulate a total of zero to n increments to the profile correlation value that corresponds to the identity profile and a given account profile.

Compare module 536 performs this process for multiple identity profiles to determine total profile correlation values between each of the identity profiles and each of the account profiles. In one aspect, a profile correlation value for a given identity profile/account profile pair is a cumulative count of attribute field pairs that are selected for mutual comparison based on the attribute field mapping rules and identified as matching based on the data content similarity of the respective attribute fields. Together the profile correlation values within profile mapping table 538 logically associate one or more of account profiles with each of one or more identity profiles.

The run-time phase further includes synchronizing field data between identity and account profiles. In the depicted embodiment, the recorded profile correlation values within profile mapping table 538 together with the attribute field mapping rules within schema rule table 530 and partial attribute field mapping rule(s) within data structure 548 are processed by a profile synchronizer 540 to perform such synchronization. For instance, profile synchronizer 540 may execute a one-time or periodic global synchronization cycle in which the profile correlation values within profile mapping table 538 are utilized to first determine which of the account profiles are to be synchronized with respect to one or more of the identity profiles. Having determined the account-profile-to-identity-profile associations (zero-to-one, one-to-one, n-to-one), profile synchronizer applies the attribute field mapping rules within schema rule table 530 to, for example, update data within attribute fields of the account profiles with data contained in the attribute fields of the associated identity profiles.

Figure 6:
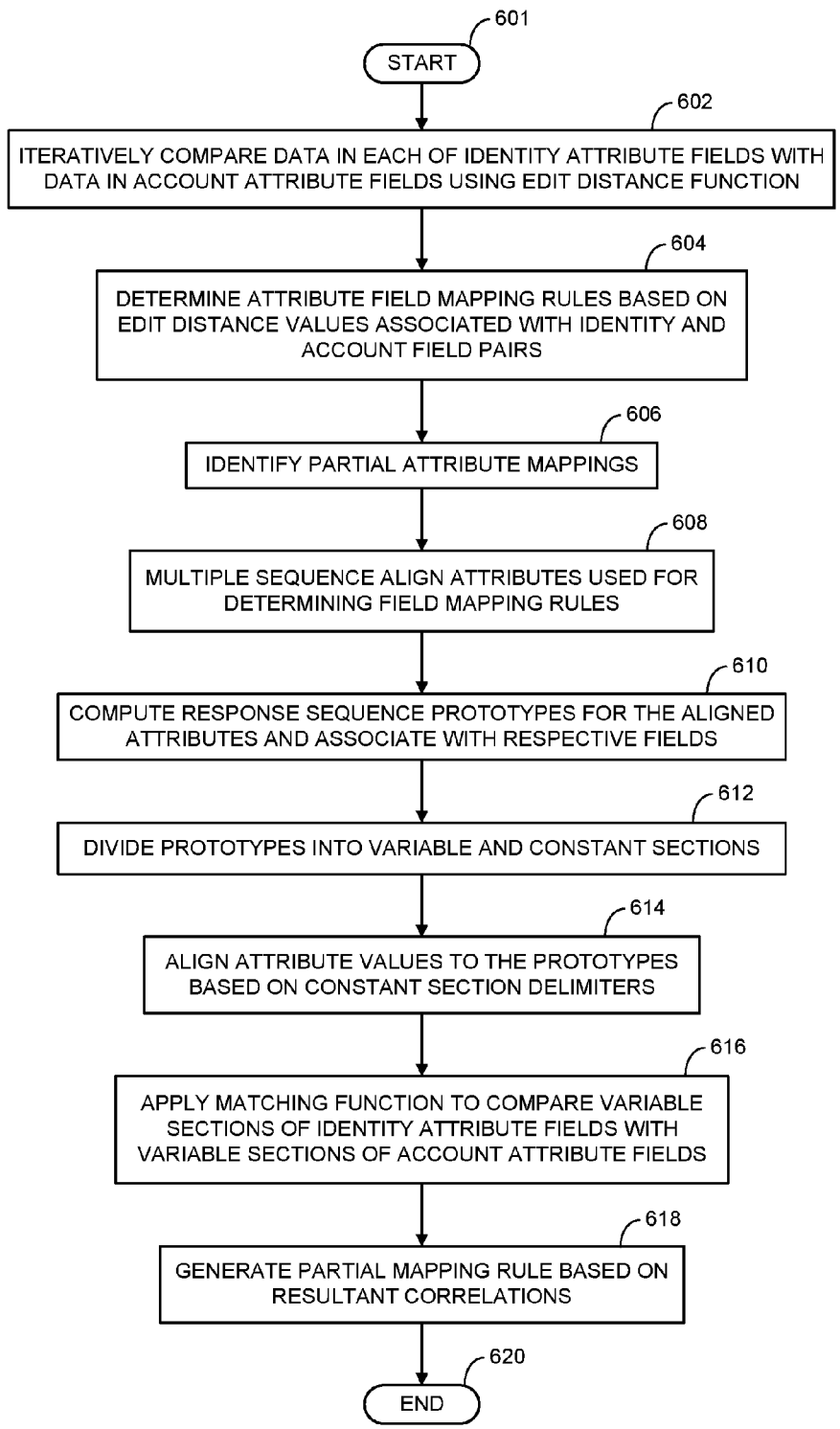
FIG. 6 is a flow diagram depicting operations and functions for determining partial attribute field mappings for identity and account profiles in accordance with an embodiment.

FIG. 6 is a flow diagram depicting operations and functions for determining partial attribute field mappings for identity and account profiles in accordance with an embodiment. The operations and functions may be performed by IAM components such as the attribute mappers and correlation identifiers depicted in FIGS. 2 and 5 and the re-mapper 545 depicted in FIG. 5. The process begins at block 601 and continues at block 602 with an attribute mapper iteratively comparing attribute field data for multiple identity profiles with attribute field data for multiple account profiles. For example, the attribute mapper may select or otherwise receive a sample set of identity and account profiles selected from a total number of identity and account profiles managed at an endpoint system or across an access management domain. The attribute mapper applies an edit distance mapping function to determine, for each identity/account field data pair, a minimum number of operations required to generate a match between the identity and account field data. The attribute may compare the "edit distance" (e.g., the minimum number of operation to render data of within an account attribute field identical to data within an identity attribute field), with a threshold value to determine whether a match exists. For instance, in response to determining that the edit distance is equal to or less than the threshold, the attribute mapper may determine a match and increment an attribute correlation value accordingly. The attribute mapper executes the edit distance and threshold compare functions iteratively to the attributes within each identity and account profiles in the selected sample.

At block 604, a correlation identifier processes sets of attribute correlation values to identify one or more dominant correlation values from which attribute mapping rules can be generated. As described with reference to FIGS. 2, 3, and 5 the dominant correlation values may be determined based on an absolute threshold, on respective correlation value comparisons, or a combination of both. Furthermore, as explained with reference to FIG. 5, each of the identified dominant correlation value(s) may be further identified as being a "full" or "partial" correlation value. A full correlation identification may result, for example, from determining that the correlation value meets or exceeds a full correlation threshold value and a partial correlation may result from determining that the correlation value does not meet or exceed the threshold. In response to determining a dominant correlation between an identity attribute field and an account attribute field, the correlation identifier generates a mapping rule that logically associates the identity and account fields. Furthermore, in response to determining that the correlation value does not meet or exceed a full correlation threshold value, the correlation identifier sets a partial correlation flag in association with the mapping rule (block 606).

At block 608, the mapping rule associated with the partial correlation flag is processed to identify corresponding identity and account attribute fields to be used for generating a new or modified mapping rule. Specifically, a re-mapper identifies the identity and account attribute fields based on the field values specified in the attribute mapping rule and performs a multiple sequence alignment on the respective identity and account attribute field data as explained with reference to FIG. 5. In an embodiment, the multiple sequence alignment fundamentally entails character-by-character comparisons between multiple data strings from the same identity or account attribute field. At block 610, the re-mapper uses the multiple sequence alignment(s) to compute sequence prototypes for the account and identity attribute fields. As shown with reference to FIG. 5, the sequence prototypes generally comprise one or more variable character fields delimited by constant delimiter characters. As part of generating the sequence prototypes, the re-mapper identifies inherent subfields within the respective identity and account attribute fields by dividing the prototypes into one or more continuous segments of variable characters (block 612). The re-mapper then aligns one or more of the attribute data values with respective sequence prototypes based on positioning of constant delimiters within the data values and prototypes (block 614). A compare function within the re-mapper applies a matching function to compare data with the variable segments of the identity and account profiles and increments partial attribute correlation values accordingly (block 616). The process ends with the re-mapper generating one or more partial attribute mapping rules based on the partial correlation values (blocks 618 and 620).

VARIATIONS

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
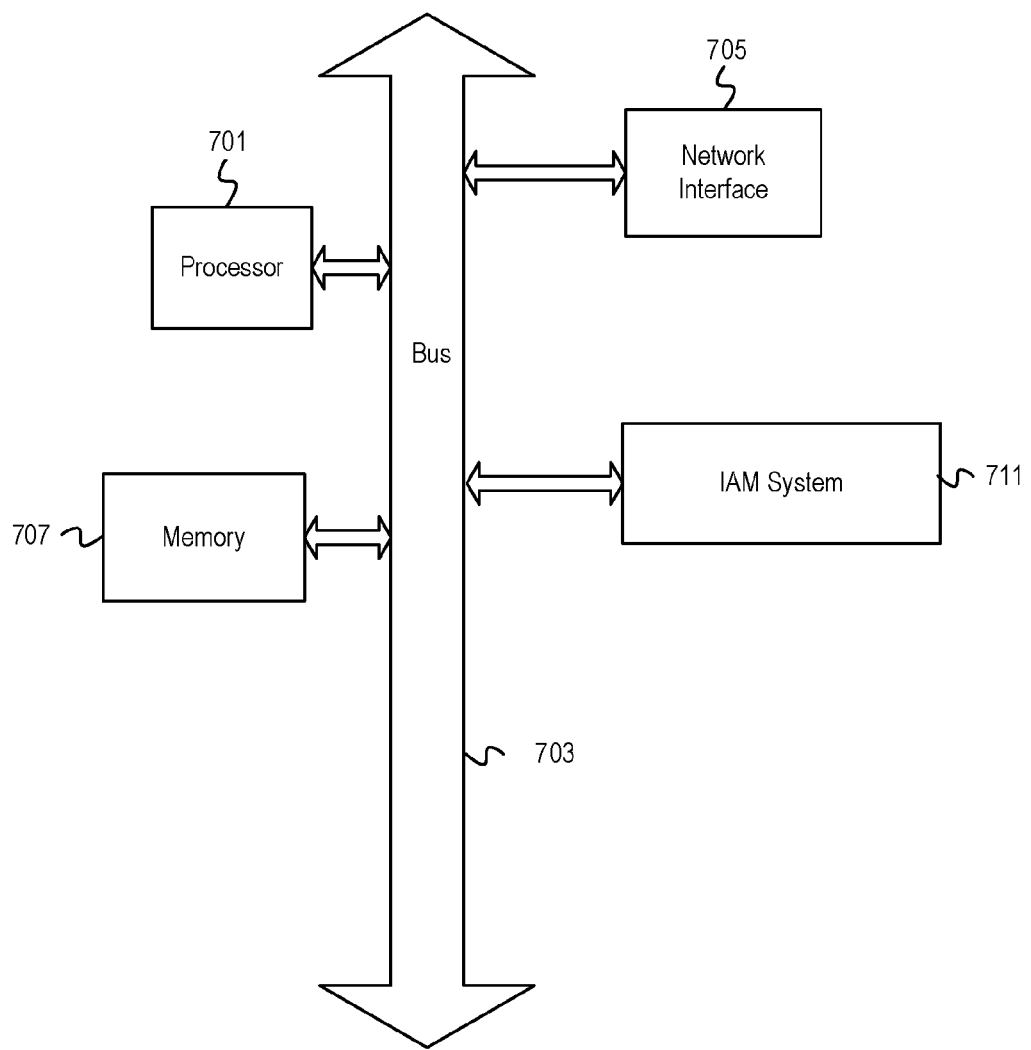
FIG. 7 depicts an example computer system that includes an identity and access management system in accordance with an embodiment.

FIG. 7 depicts an example computer system that implements identity and account profile synchronization in accordance with an embodiment. The computer system includes a processor unit 701 (possibly including multiple processors, multiple cores, multiple nodes, and/or implementing multithreading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, Hyper-Transport® bus, InfiniBand® bus, NuBus, etc.) and a network interface 705 (e.g., a Fiber Channel interface, an Ethernet interface, an internet small computer system interface, SONET interface, wireless interface, etc.). The system also includes an identity and access management (IAM) system 711. The IAM system 711 provides program structures for collecting, storing, and processing identity information within identity and account profile data structures. The identity information is recorded in attribute fields of respective identity and account profiles and is compared using one or more matching functions to determine correlations between identity and account profile schemas. The IAM system 711 uses the schema correlations to associate system resource accounts to the identity profiles and further applies the account-to-identity associations in combination with the profile schema correlations to synchronize data between the identity profiles and the account profiles. Any one of the previously described functionalities may be partially (or entirely) implemented in hardware and/or on the processor unit 701. For example, the functionality may be implemented with an application specific integrated circuit, in logic implemented in the processor unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701 and the network interface 705 are coupled to the bus 703. Although illustrated as being coupled to the bus 703, the memory 707 may be coupled to the processor unit 701.

While the aspects of the disclosure are described with reference to various implementations and exploitations, it will be understood that these aspects are illustrative and that the scope of the claims is not limited to them. In general, techniques for an object storage backed file system that efficiently manipulates namespace as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:

1. A method for managing profiles in an access management domain, said method comprising:
    generating attribute field mapping rules for an identity profile schema applied to a plurality of identity profiles and an account profile schema applied to a plurality of account profiles, wherein each of the identity profiles includes one or more identity attribute fields and each of the plurality of account profiles includes one or more account attribute fields, wherein said generating attribute field mapping rules includes,
        iteratively comparing data in each of the identity attribute fields with data in one or more of each of the account attribute fields;
        in response to detecting a match between data in a given identity attribute field and data in a given account attribute field, incrementing an attribute correlation value that is uniquely logically associated with the given identity attribute field and the given account attribute field;
        comparing attribute correlation values that are each associated with a same identity attribute field; and
        identifying a dominant attribute correlation value based on said comparing attribute correlation values.

2. The method of claim 1, wherein said identifying a dominant attribute correlation value comprises, for multiple attribute correlation values that are each logically associated with a different account attribute field and are all associated with a same identity attribute field, determining a largest attribute correlation value.

3. The method of claim 2, wherein said identifying a dominant attribute correlation value further comprises determining whether the largest attribute correlation value meets a specified threshold value.

4. The method of claim 1, wherein said determining attribute field mapping rules further includes logically associating multiple identity attribute field identifiers with respective account attribute field identifiers in accordance with identified dominant attribute correlation values that are each uniquely logically associated with respective pairs of identity attribute fields and account attribute fields.

5. The method of claim 1, further comprising logically associating each of the identity profiles with one or more of the account profiles based on the determined attribute field mapping rules.

6. The method of claim 5, wherein the one or more account profiles have a specified account profile schema, and wherein said logically associating each of the identity profiles with one or more of the account profiles includes:
    for each of one or more identity attribute fields within an identity profile,
        applying at least one of the attribute field mapping rules to identity a corresponding account attribute field identifier for the specified account profile schema;
        comparing data in each of one or more account attribute fields that correspond to the identified account attribute field identifier for the account profiles with data in the identity attribute field; and
        for each comparison, and in response to a determining a match between data in the account attribute field and data in the identity attribute field, incrementing a profile correlation value that is logically associated with the account profile and the identity profile.

7. The method of claim 6, further comprising synchronizing data between the identity attribute fields in the identity profiles and the account attribute fields in the account profiles based, at least in part, on one or more profile correlation values.

8. The method of claim 6, further comprising:
    generating and storing logical mapping relations from each of one or more identity attribute field identifiers to a corresponding each of one or more account attribute field identifiers; and
    in response to detecting a modification to data stored within the at least one identity profile,
        identifying one or more account profiles based on one or more profile correlation values; and
        for each of the identified account profiles,
            identifying a related account attribute field in accordance with a logical mapping relation associated with an attribute field mapping rule; and
            modifying data in the related account attribute field based on the modification to the data stored within the at least one identity profile.

9. One or more machine-readable storage media having program code for managing profiles in an access management domain, the program code comprising instructions to:
    generate attribute field mapping rules for an identity profile schema applied to a plurality of identity profiles and an account profile schema applied to a plurality of account profiles, wherein each of the identity profiles includes one or more identity attribute fields and each of the plurality of account profiles includes one or more account attribute fields, wherein said generating attribute field mapping rules includes,
        iteratively compare data in each of the identity attribute fields with data in one or more of each of the account attribute fields;
        in response to detecting a match between data in a given identity attribute field and data in a given account attribute field, increment an attribute correlation value that is uniquely logically associated with the given identity attribute field and the given account attribute field;
        compare attribute correlation values that are each associated with a same identity attribute field; and
        identify a dominant attribute correlation value based on said comparing attribute correlation values.

10. The machine-readable storage media of claim 9, wherein said identifying a dominant attribute correlation value comprises, for multiple attribute correlation values that are each logically associated with a different account attribute field and are all associated with a same identity attribute field, determining a largest attribute correlation value.

11. The machine-readable storage media of claim 10, wherein said identifying a dominant attribute correlation value further comprises determining whether the largest attribute correlation value meets a specified threshold value.

12. The machine-readable storage media of claim 9, further comprising logically associating each of the identity profiles with one or more of the account profiles based on the determined attribute field mapping rules.

13. The machine-readable storage media of claim 12, wherein the one or more account profiles have a specified account profile schema, and wherein said logically associating each of the identity profiles with one or more of the account profiles includes:
    for each of one or more identity attribute fields within an identity profile, applying at least one of the attribute field mapping rules to identity a corresponding account attribute field identifier for the specified account profile schema;

comparing data in each of one or more account attribute fields that correspond to the identified account attribute field identifier for the account profiles with data in the identity attribute field; and for each comparison, and in response to a determining a match between data in the account attribute field and data in the identity attribute field, incrementing a profile correlation value that is logically associated with the account profile and the identity profile.

14. The machine-readable storage media of claim 13, further comprising synchronizing data between the identity attribute fields in the identity profiles and the account attribute fields in the account profiles based, at least in part, on one or more profile correlation values.

15. The machine-readable storage media of claim 14, further comprising:

generating and storing logical mapping relations from each of one or more identity attribute field identifiers to a corresponding each of one or more account attribute field identifiers; and in response to detecting a modification to data stored within the at least one identity profile, identifying one or more account profiles based on one or more profile correlation values; and for each of the identified account profiles, identifying a related account attribute field in accordance with a logical mapping relation associated with an attribute field mapping rule; and modifying data in the related account attribute field based on the modification to the data stored within the at least one identity profile.

16. An apparatus comprising:

a processor; and a machine-readable medium having program code executable by the processor to cause the apparatus to, generate attribute field mapping rules for an identity profile schema applied to a plurality of identity profiles and an account profile schema applied to a plurality of account profiles, wherein each of the identity profiles includes one or more identity attribute fields and each of the plurality of account profiles includes one or more account attribute fields, wherein said generating attribute field mapping rules includes, iteratively compare data in each of the identity attribute fields with data in one or more of each of the account attribute fields;

in response to detecting a match between data in a given identity attribute field and data in a given account attribute field, increment an attribute correlation value that is uniquely logically associated with the given identity attribute field and the given account attribute field;

compare attribute correlation values that are each associated with a same identity attribute field; and identify a dominant attribute correlation value based on said comparing attribute correlation values.

17. The apparatus of claim 16, wherein said identifying a dominant attribute correlation value comprises, for multiple attribute correlation values that are each logically associated with a different account attribute field and are all associated with a same identity attribute field, determining a largest attribute correlation value.

18. The apparatus of claim 17, wherein said identifying a dominant attribute correlation value further comprises determining whether the largest attribute correlation value meets a specified threshold value.

19. The apparatus of claim 18, wherein the one or more account profiles have a specified account profile schema, and wherein said logically associating each of the identity profiles with one or more of the account profiles includes:

for each of one or more identity attribute fields within an identity profile, applying at least one of the attribute field mapping rules to identity a corresponding account attribute field identifier for the specified account profile schema;

comparing data in each of one or more account attribute fields that correspond to the identified account attribute field identifier for the account profiles with data in the identity attribute field; and for each comparison, and in response to a determining a match between data in the account attribute field and data in the identity attribute field, incrementing a profile correlation value that is logically associated with the account profile and the identity profile.

20. The apparatus of claim 19, wherein the machine-readable medium further includes program code executable by the processor to cause the apparatus to synchronize data between the identity attribute fields in the identity profiles and the account attribute fields in the account profiles based, at least in part, on one or more profile correlation values.

* * * * *